United States Patent [19]

Dobala

[11] 4,002,138

[45] Jan. 11, 1977

[54] AUTO SAFETY FLAG AND HOLDER

[76] Inventor: Ronald J. Dobala, 1620 Center Road, West Seneca, N.Y. 14224

[22] Filed: Sept. 26, 1975

[21] Appl. No.: 616,934

[52] U.S. Cl. .............................. 116/28 R; 116/173
[51] Int. Cl.$^2$ ............................................. B60Q 7/00
[58] Field of Search ................ 116/28 R, 173, 174, 116/175, 42; 40/129 C

[56] References Cited

UNITED STATES PATENTS

| | | | |
|---|---|---|---|
| 1,202,493 | 10/1916 | Dollenberg | 116/42 |
| 1,453,911 | 4/1923 | Browne | 116/42 |
| 2,445,606 | 7/1948 | Davis | 40/129 C |
| 2,534,117 | 12/1950 | Flick | 116/173 |
| 3,158,132 | 11/1964 | Guthrie | 116/173 |
| 3,239,957 | 3/1966 | Snediger | 116/174 |
| 3,672,323 | 6/1972 | Hawes | 40/129 C |
| 3,703,152 | 11/1972 | Morton | 40/129 C |
| 3,715,821 | 2/1973 | Hawes | 116/173 |
| 3,738,039 | 6/1973 | De Furia | 40/129 C |
| 3,762,360 | 10/1973 | Hawes | 40/129 C |

*Primary Examiner*—Donald O. Woodiel
*Assistant Examiner*—Denis E. Corr

[57] ABSTRACT

This invention is a warning flag and holder used as a safety device for motorists on the road.

1 Claim, 4 Drawing Figures

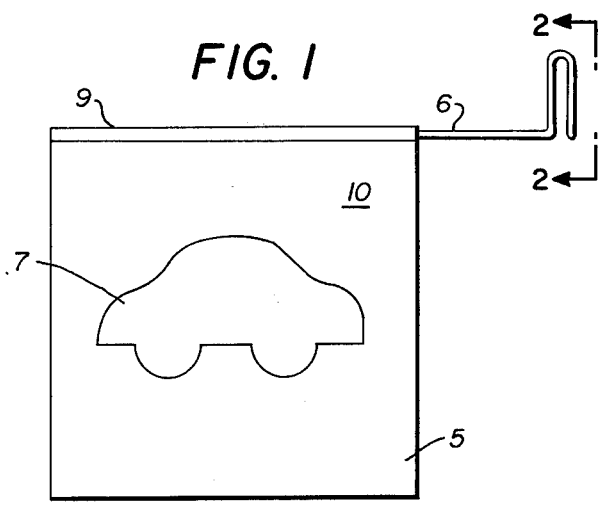
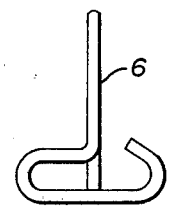
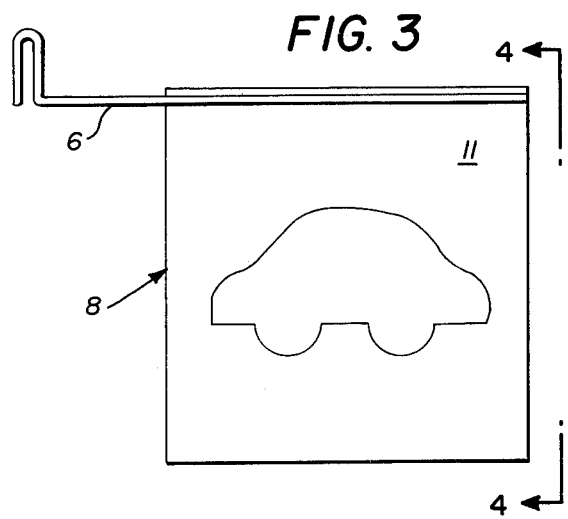
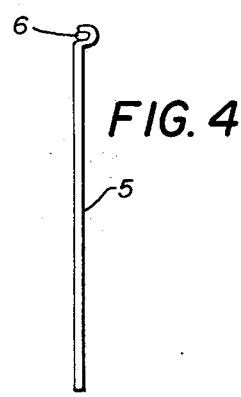

AUTO SAFETY FLAG AND HOLDER

The reason for the invention is to provide a motorist with a safety device which can be easily used from inside of his car by simply lowering his window halfway and mounting the flag and holder on his window, displaying a warning to traffic from either direction that his car is disabled and in need of assistance. This further reduces the danger of accident by not wandering outside of the car especially at night and during foul weather.

Some other reasons for this invention are: The flag is easily assembled and disassembled, compact and can be stored in the car at all times. It is also a safety device which is simple in design, inexpensive to manufacture, strongly constructed and efficient in operation.

These reasons can be easily seen by studying the following specifications and submitted drawings:

FIG. I is a side elevation view of the front side of the flag.

FIG. II is a cross-sectional view taken on the line 2—2 of FIG. I.

FIG. III is a side elevation view of a backside of the flag.

FIG. IV is a view taken on the line 4—4 of FIG. III.

In reference to the drawing in detail, the reference No. 8 the flag which is secured to the rod 5 and 6 represents the safety device and invention for motorists.

The rod is comprised of aluminum, but either plastic or other suitable metals could be used.

The rod (No. 6) in detail, using a ⅜ inch radius, is to be bent 90° at approximately 13¾ inches of its length (22 inches), then at approximately ½ inch from the 13¾ inches point, a 180° bend 2½ inches high should be made. Forming a channel as per FIG. I, the remainder of the rod then is formed, using ⅜ inch radius, 2 inches wide at the bottom and bent up at the end as per FIG. 2. The rod has now been manufactured to accept a car window edge.

The flag 5 is made of a plastic fluorescent material and has a square shape, 10 inches × 10 inches. It is folded over at the top to form a loop ⅛ inch so that rod can be inserted and the flag can hang down.

The sides of the flag No. 10 front and back are a bright white color. The inner picture of an auto No. 7 also on the front and back of flag is a bright red. Other colors can be substituted according to national safety standards.

The scale for this drawing is one quarter of an inch equals 1 inch—(¼ inch equals 1 inch).

It is now evident that when in use, the flag No. 8 when fitted over rod No. 6 and is hung on the window of the car, can easily be seen by traffic from either direction, warning that car is disabled and in need of assistance.

What I now claim is:

1. A safety device for motorists consisting of a flag and rod, said flag being made of material with a folded over loop, said rod being received in said loop and having a first straight section where it is contiguous to said flag within said loop, said first straight section also extending away from said flag to terminate in a series of other straight sections and angular bends which are all adapted to hold said first straight section of said rod and said flag away from a vehicle window when said device is in use, said series comprising second and third straight sections, the first and second straight sections being tied by a first bend, the second and third straight sections being tied by a 180° second bend such that said second and third sections are in a common plane, the rest of the rod being tied to said third section by a ninety degree third bend, and the rest of the rod is substantially in a second plane normal to said first plane and adapted to be substantially contiguous to said vehicle window when said device is in use.

* * * * *